Oct. 17, 1933. G. R. BURRELL 1,930,736
METHOD OF AND APPARATUS FOR TREATING RUBBER
Filed May 31, 1930
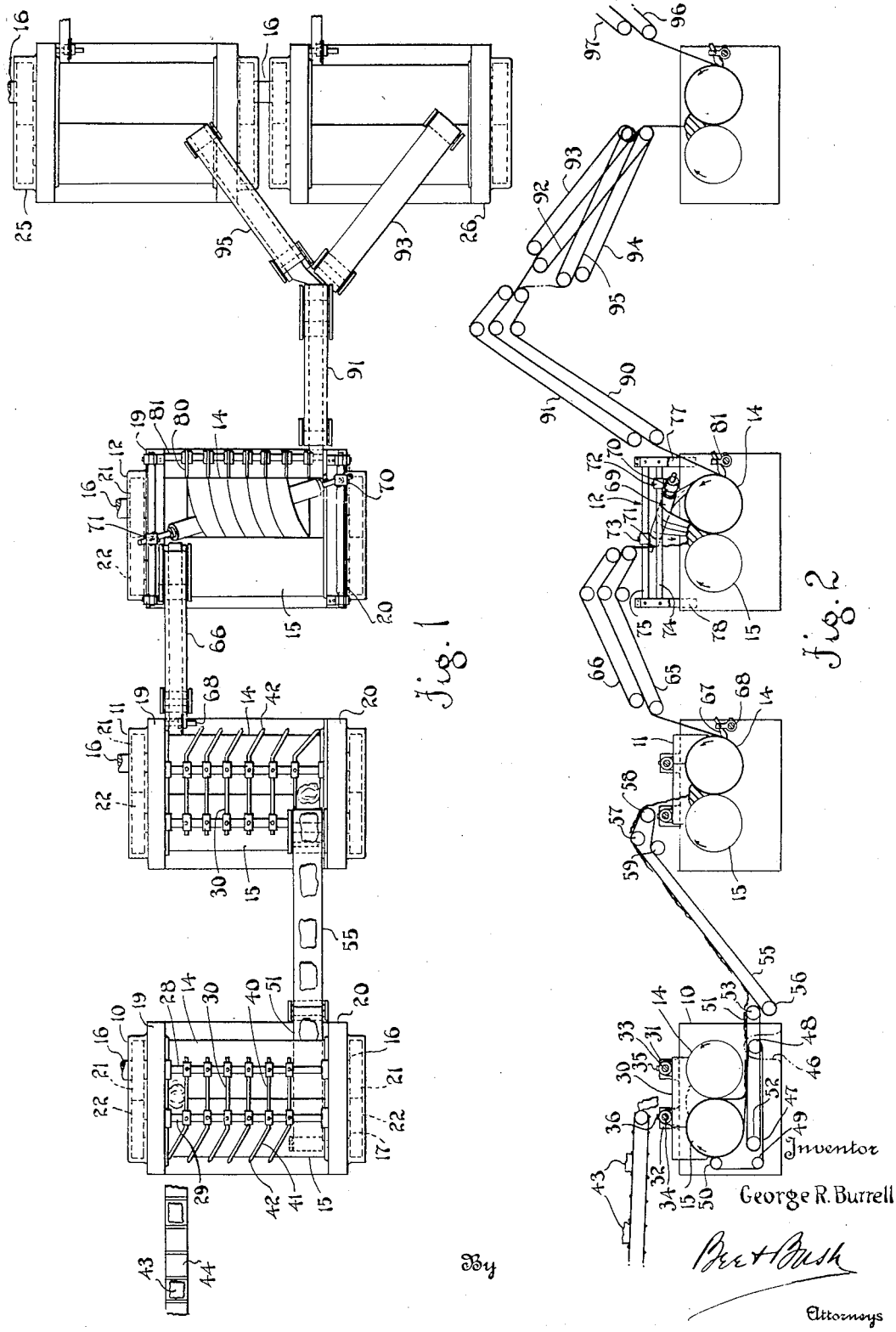

Patented Oct. 17, 1933

1,930,736

UNITED STATES PATENT OFFICE 1,930,736

METHOD OF AND APPARATUS FOR TREATING RUBBER

George R. Burrell, Akron, Ohio, assignor to Wingfoot Corporation, Wilmington, Del., a corporation of Delaware Application May 31, 1930. Serial No. 457,915

10 Claims. (Cl. 18—2)

This invention relates to the manufacture of rubber, and has particular relation to an apparatus and process for automatically plasticizing and manipulating rubber prior to vulcanization thereof.

An object of the invention is to provide a method of manufacturing rubber, and particularly for manipulating it in its unvulcanized state, by means of which practically continuous treatment of the rubber is secured from the time it is in its raw or green condition until it is in condition for impregnating fabrics or for other uses to which rubber is applicable.

Another object of the invention is to provide a method of so manipulating rubber in mixing or milling machines that it is automatically moved from one machine to another.

Another object of the invention is to provide a method of so treating rubber that plasticization thereof may be controlled in a manner more uniform than that which has been possible heretofore.

Another object of the invention is to provide an apparatus for constantly manipulating rubber from the time it is in its raw or green condition until it is in condition for use in calendering and other rubber manufacturing machines.

Another object of the invention is to provide an apparatus for automatically moving rubber longitudinally of the rolls of a mixing or milling machine.

Another object of the invention is to provide an apparatus for cooling rubber during plasticization thereof.

In the manufacture of rubber, it is necessary that the material in its raw or green state, be rendered sufficiently plastic, that chemical ingredients may be properly compounded with it. Ordinarily, mixing or milling machines are employed for plasticizing rubber, and each of such machines comprises a pair of rollers driven in opposite directions, between which the rubber is conducted. When raw rubber first is passed through one of these machines, it usually does not adhere to either of the rollers, but falls to the floor beneath them, and must be picked up by operators and again disposed in the trough formed by the adjacent arcuate upper surfaces of the rollers. Continued passage of the rubber between the rollers finally renders it to such plastic state that it adheres to one of them. A manifest disadvantage of this practice of plasticizing rubber is that the degree of plasticization of any part of the rubber is indefinite, because a batch of the rubber usually remains in the trough between the upper surfaces of the rollers, and it is speculative as to what parts of the rubber pass between the rollers and what part remains in the trough, or how many times various parts pass between the rollers. In other words, it is clearly possible for one part of the rubber to be kneaded or milled considerably more than another part.

Other disadvantages of the practice described above involve various phases of the work that must be done by operators. This is especially true in the initial stages of plasticization wherein the rubber falls to the floor and must be again disposed in the trough. Also, after the rubber is reduced to such a state that it adheres to the surface of one of the rollers, it is desirable and almost essential that the rubber adhering to the surface be severed or removed therefrom, in order to permit other parts of the batch to pass through the rollers properly. Also, it is desirable that rubber at one end of the roller be moved to the other end of the roller to insure better mixing of the entire batch of rubber being plasticized. All of these operations have been performed manually and, as a result, the degree of plasticization is uncertain, because such operations usually are irregular.

According to this invention, rubber in its raw or green state is plasticized uniformly and progressively by apparatus and mechanisms which obviate the uncertainties of plasticization of rubber that attended the prior practices. The invention comprises a series of milling machines each of which manipulates the rubber during one stage of plasticization thereof. Slabs of raw or green rubber are fed to the first milling machine, and a conveyor disposed beneath the rollers of such machine conveys the rubber falling beneath the rollers again to the trough formed between the upper surfaces thereof. Plows associated with the machine cause the rubber uniformly to be moved longitudinally of the rollers thereby insuring that each part of the rubber will be passed between the rollers an equal number of times before it reaches the end of the machine. When the rubber reaches the end of the machine, it is transported by a conveyor to a second machine similar to the first and is manipulated in a like manner therein. Ordinarily, the rubber being manipulated by the second machine is sufficiently plastic to adhere to one of the rollers, and, consequently, a conveyor beneath the rollers such as that provided in the first machine is not necessary. However, it should be understood that more than two of these machines may be provided and that conveyors beneath the rollers therein may be employed wherever found necessary. After the rubber passes through the second milling machine, it is transported in strip form to another milling machine and is also moved longitudinally of the rollers in the latter. Means are provided for cooling the rubber during certain stages of plasticization, in order to prevent the generation of heat that might deteriorate the rubber.

After passage of the rubber through the last of the milling machines, it is conveyed in strip form to one of several compounding machines until a predetermined amount of rubber is supplied thereto. Then the rubber is severed from the latter machine and the strip is conducted to a second compounding machine in a similar manner. As many compounding machines may be provided as are necessary in order to insure complete compounding of the rubber in one machine during the conduction of rubber to the other compounding machines. Hence, the rubber may be conducted continuously in strip form from the last of the milling machines without interruption. After compounding of rubber in one of the compounding machines it is conveyed in strip form to calendering and other rubber manufacturing machines.

For a better understanding of the invention, reference may now be had to the accompanying drawing, forming a part of this specification, in which:

Fig. 1 is a plan view of a machine for treating rubber constructed according to one embodiment of the invention; and Fig. 2 is a side view of the machines illustrated by Fig. 1.

In practicing the invention, rubber milling machines 10, 11 and 12 are disposed in parallel, spaced relation. Each of the milling machines comprises a pair of rollers 14 and 15 mounted respectively on shafts 16 and 17 journaled in a pair of frame standards 19 and 20. The shaft 16 is driven by an electric motor (not shown) and rotary motion is imparted to the shaft 17 by intermeshing gears 21 and 22 on the ends of the shafts 16 and 17, respectively. Ordinarily, one of the rollers is of larger diameter than the other, and, consequently, its peripheral rate of speed is greater. This is desirable because rubber passing between a pair of rollers having different peripheral speeds is milled more satisfactorily. Beyond the milling machine 12, a pair of rubber compounding machines 25 and 26, similar to the milling machine, are located in aligned relation. The shaft 16 in the machine 25 is driven, and in turn is so connected to the shaft 16 of the machine 26, that it imparts rotary motion to the rollers in the latter machine.

Above the rollers 14 and 15, the machines 10 and 11 are provided with spaced bars 28 and 29 extending between and secured to the standards 19 and 20. These bars support a plurality of plows 30 spaced longitudinally of the rollers, and, as best shown by Fig. 2, each of the plows is provided with bosses 31 and 32 having openings 33 and 34 through which the bars 28 and 29 extend, respectively. The plows are adjustably secured to the bars 28 and 29 by set screws 35 and 36 threaded through the bosses and engaging the bars. The lower edge of each of the plows is so constructed that it embraces portions of the surfaces of the rollers 14 and 15, thereby insuring that the rubber between any pair of plows will pass between the portions of the rollers commensurate in width to the distance between such pair of plows. As best shown by Fig. 1, each of the plows is provided with a portion 40 extending perpendicularly to the shafts of the rollers, and across the trough formed between the upper surfaces thereof, and an oblique portion 41 projecting downwardly about the side surface of the roller 15 remote with respect to the roller 14. In the machine 11, plows 30 correspond to and are disposed in reversed relation with respect to the plows in the machine 10, but otherwise they are identical in construction. The plows are adapted progressively to move rubber along the rollers 14 and 15, and to facilitate such movement of the rubber between the oblique portions of the plows, the free edges of such oblique portions are sharpened as indicated at 42.

In operating the machines 10 and 11, blocks 43 of raw or green rubber are transported by a conveyor 44 to a position above the milling machine 10, and at the end thereof adjacent the standard 19. As the rubber falls between the end plow and the standard 19, it is drawn between the rollers 14 and 15, but its condition with reference to plasticity is such, that it does not adhere to either of the rollers. After the rubber has passed between the rollers 14 and 15, it falls upon an endless conveyor 47 (Fig. 2) which is trained about a roller 48 journaled at one end in the standard 19, and at its other end in a bearing bracket 46 supported by the base of the machine 10 beneath the plow 30 adjacent the standard 20. Also, the conveyor 47 is trained about a roller 49 journaled in the standards 19 and 20 in substantially the same horizontal plane as the roller 48 and then about a roller 50 journaled in and extending between the standards 19 and 20 adjacent the lower edge of the oblique portions 41 of the plows 30.

By reason of this construction the conveyor 47 moves substantially tangentially to the lower surfaces of the rollers, and actually engages the surface of the roller 15 from its lowest point to a point adjacent the ends of the oblique portions 41 of the plows 30. The rubber is transported by the conveyor 47 to positions adjacent the ends of the oblique portions 41 of the two end plows adjacent the standard 19 and then is moved between the oblique portions by reason of its contacting with the surface of the roller 15 above the roller 50. It is apparent that the rubber so conveyed back to the upper surface of the roller 15 moves into the space between plows next to that space through which it had previously passed, and that in this manner the rubber progressively is moved longitudinally of the rollers 14 and 15. Also, each part of the rubber is passed between the rollers substantially the same number of times which insures uniform plasticization thereof. When the rubber finally moves into the space between the last of the plows 30 and the standard 20 and passes between the rollers 14 and 15, it falls upon a conveyor 51 trained about rollers 52 and 53 disposed in a plane substantially parallel to the horizontal portion of the conveyor 47, but at one side thereof. When the rubber is moved beyond the outer end of the conveyor 51, it falls upon an upwardly inclined conveyor 55 and finally is dropped between the standard 20 and the plow 30 in the machine 11. Then the rubber is progressively moved along the rollers 14 and 15 in the machine 11 by the plows 30 and at the same time is milled while passing between such rollers. During milling of the rubber in the machine 11 it becomes sufficiently plastic that it adheres to one of the rollers, and, in the apparatus shown, it is caused to adhere to the roller 14. However, it should be understood that, if the rubber should not become sufficiently plastic in the machine 11 to adhere to one roller in sheet form, one or more additional machines similar to machine 11 may be provided, and that the rubber may be conveyed to such additional machines in the same manner that it is conveyed from the machine 10 to the machine 11. When the rubber reaches the discharge end of the machine 11, it is conveyed in strip form between a pair of endless conveyors 65 and 66, to the machine 12. The strip removed from the machine 11 is substantially equal in width to the distance between two of the plows 30, and is severed from the roller 14 by a knife 67 adjustably secured to a bar 68 projecting from the standard 19.

During plasticization of rubber in machines of this character, considerable heat is generated in the rubber, and it is desirable that some means be provided for preventing it from being injured by reason of such heat. Means of this character is provided in the machine 12, and comprises a roller 69 having its ends journaled in sleeves 70 and 71 pivotally connected to and depending from sleeves 72 and 73. The sleeves 72 and 73 are adjustably secured to bars 74 and 75 projecting between and secured to uprights 77 and 78 on the standards 19 and 20. The bars 74 and 75 are disposed in vertically spaced relation and, consequently, the roller 69 is inclined to the vertical. Also, by disposing the sleeves 72 and 73 in various positions along the bar 74 and 75, the roller 69 can be positioned out of alignment with the rollers 14 and 15 in the machine. Moreover, the bars 74 and 75 at each end of the machine permit reversing the position of the roller 69 insofar as it is inclined to the vertical.

As the rubber sheet clinging to the roller 14 moves with the latter, it is severed into a plurality of strips by knives 80 adjustably mounted on a bar 81 extending between the standards 19 and 20. Preferably, alternate strips of rubber so cut are directed about the roller 69, and by reason of moving over such roller are again directed between the roller 14 and 15 at points spaced longitudinally of the rollers with respect to the points from which such strips were removed. While preferably alternating strips are directed over the roller 69, if found desirable, the entire sheet of rubber on the roller 14 may be directed over the roller 69. Movement of the rubber over the roller 69 progressively moves it longitudinally of the machine, and during its movement, it is cooled, because both sides of the strips directed about the roller are exposed to the air during a large portion of the time that it is being treated.

When the rubber reaches the discharge end of the machine 12, it is conveyed upwardly in strip form between conveyors 90 and 91, to a point above the machine 25 and 26. At the discharge end of the conveyors 90 and 91, the strip of rubber may be directed between conveyors 92 and 93 leading to the machine 26, or between conveyors 94 and 95 leading to the machine 25. As many of the machines 25 and 26 may be provided as found desirable, and the same number of conveyors may be provided for directing rubber from the discharge end of the conveyors 90 and 91 to such machines. Rubber is conveyed to one of the machines until the desired amount thereof has been supplied, and then the strip of rubber is conveyed to another of the machines and the desired amount of rubber is supplied to the last machine. After one machine has been supplied with rubber, it is mixed with compounding ingredients during the time that the other machine is being supplied with rubber. After the rubber is properly compounded, it is conveyed in strip form between conveyors 96 and 97 to calendering or other rubber manufacturing machines. When all of the rubber has so been conveyed from one of the machines, the rubber from the machine 12 again is supplied to the compounding machine from which rubber has been exhausted and the cycle of operation is repeated.

From the foregoing description, it is apparent that machine has been provided for plasticizing rubber by the use of which, rubber may be taken in its raw state and progressively plasticized in a continuous and automatic operation. Moreover, the rubber is plasticized more uniformly and thoroughly than has been possible in plasticizing rubber according to prior practices. Also, novel and efficient means have been provided for progressively moving the rubber longitudinally of the rollers in the milling machines, insuring passage of all parts of the rubber and an equal number of times between the rollers thereof. It is also apparent that an efficient means has been provided for preventing the rubber being milled from becoming sufficiently warm to cause damage thereto.

Although only the preferred form of the invention has been described and shown in detail, it will be apparent to those skilled in the art that the invention is not so limited but that various minor modifications may be made therein, without departing from the spirit of the invention or from the scope of the appended claims.

What I claim is:

1. An apparatus for plasticizing rubber, which comprises a series of milling machines including rollers, means on each machine for automatically moving the rubber longitudinally of the rollers as is is milled, automatic means for transporting the rubber from one machine to another, and means for removing the rubber from the last machine in a continuous strip.

2. An apparatus for plasticizing rubber, which comprises a series of milling machines including rollers, means on each machine for automatically moving the rubber longitudinally of the milling rollers as it is milled, and automatic means for transporting the rubber from one machine to another.

3. An apparatus for plasticizing rubber, which comprises a series of rubber plasticizing machines, means incorporated with said machines adapted to uniformly manipulate the rubber during various stages of plasticization, respectively, and automatic means for transporting the rubber from one machine to another.

4. An apparatus for plasticizing rubber, which comprises a series of rubber plasticizing machines adapted to uniformly manipulate the rubber during successive stages of plasticization, respectively, and automatic means for transporting the rubber from one machine to another in sequential order.

5. An apparatus for plasticizing rubber, which comprises a series of rubber plasticizing machines adapted to manipulate the rubber during various stages of its plasticization, respectively, means associated with the machines for insuring uniform plasticization of the rubber in each machine, and means for automatically transferring the rubber from one machine to another.

6. An apparatus for plasticizing rubber, which comprises a milling machine including driven rollers, and means for moving the rubber from one end to the other of the rollers as it is plasticized.

7. An apparatus for plasticizing rubber, which comprises a series of plasticizing machines, means for causing a continuous movement of rubber through the machines in sequential order, and means for removing the rubber from the last machine without interrupting the operation of the machines.

8. A machine for treating rubber, which includes a pair of rollers about which rubber is manipulated, and a series of fixed plows for moving the rubber from one end to the other of the rollers.

9. An apparatus for treating rubber, which comprises a pair of driven rollers between which rubber is milled, and fixed plows for causing all parts of a rubber mass being milled, to be passed between the rollers substantially the same number of times.

10. The method of plasticizing rubber which comprises passing the rubber through a series of plasticizing machines adapted to plasticize the rubber in progressive stages, and finally so removing the rubber in continuous strip form to a series of compounding machines selectively, that during compounding of rubber in one of the latter machines, another compounding machine may be supplied with the proper amount of rubber without interrupting the plasticizing operation.

GEORGE R. BURRELL.